US008223404B2

United States Patent
Kawasaki

(10) Patent No.: US 8,223,404 B2
(45) Date of Patent: Jul. 17, 2012

(54) IMAGE FORMING SYSTEM, COMPUTER READABLE RECORDING MEDIUM STORING IMAGE FORMING PROGRAM AND IMAGE FORMING METHOD

(75) Inventor: Tomohiro Kawasaki, Osaka (JP)

(73) Assignee: KYOCERA Document Solutions Inc. (JP)

( * ) Notice: Subject to any disclaimer, the term of this patent is extended or adjusted under 35 U.S.C. 154(b) by 619 days.

(21) Appl. No.: 12/044,774

(22) Filed: Mar. 7, 2008

(65) Prior Publication Data

US 2008/0218804 A1     Sep. 11, 2008

(30) Foreign Application Priority Data

Mar. 7, 2007   (JP) ................................ 2007-056797
Mar. 7, 2007   (JP) ................................ 2007-056798

(51) Int. Cl.
*H04N 1/40*     (2006.01)
(52) U.S. Cl. ........ 358/3.23; 358/1.9; 358/1.15; 345/501
(58) Field of Classification Search ................. 358/3.23, 358/1.9, 1.15; 345/501
See application file for complete search history.

(56) References Cited

U.S. PATENT DOCUMENTS

| | | | | |
|---|---|---|---|---|
| 7,154,633 | B2 * | 12/2006 | Shimazaki | 358/1.9 |
| 2001/0017627 | A1 * | 8/2001 | Marsden et al. | 345/501 |
| 2008/0079968 | A1 * | 4/2008 | Ho et al. | 358/1.9 |

FOREIGN PATENT DOCUMENTS

| | | |
|---|---|---|
| JP | 08-101828 | 4/1996 |
| JP | B3848196-1 | 10/2003 |
| JP | 2004-074697 | 3/2004 |
| JP | 2004-129067 | 4/2004 |
| JP | 2004-172809 A | 6/2004 |
| JP | 2004-236174 A | 8/2004 |
| JP | 2006-284812 | 10/2006 |

* cited by examiner

*Primary Examiner* — Twyler Haskins
*Assistant Examiner* — Michael Burleson
(74) *Attorney, Agent, or Firm* — Stephen Chin; von Simson & Chin, LLP

(57) ABSTRACT

An image forming system according to an aspect of the present invention comprises a component data acquiring unit that acquires a component from color lookup table data; a verifying unit that determines whether or not the component of the color lookup table data acquired by the component data acquiring unit has been generated according to a predetermined generating rule; and a download data generating unit that downloads the color lookup table data and generates download data to be used in image forming processing from the color lookup table data after the verifying unit determines that the component has been generated according to the generating rule.

9 Claims, 14 Drawing Sheets

FIG. 3

| CLASSI-FICATION | ITEM | CONTENT (EXAMPLE) |
|---|---|---|
| COMPONENT Aa | INPUT COLOR SPACE | INPUT COLOR OF COLOR LUT (RGB,CMYK,LAB,GRAY SCALE) |
| | OUTPUT COLOR SPACE | OUTPUT COLOR OF COLOR LUT (CMYK,K) |
| | TARGET OBJECT | DATA OBJECT TO BE PROCESSED (IMAGE/TEXT/VECTOR/ALL) |
| | NUMBER OF GRID POINTS | NUMBER OF GRID POINTS IN COLOR LUT (6,9,17) |
| BODY Ab | DATA BODY | DATA OF COLOR LUT |

FIG. 4

| ITEM | CONTENT (EXAMPLE) |
|---|---|
| INPUT COLOR SPACE | INPUT COLOR OF COLOR LUT (RGB,CMYK,LAB,GRAY SCALE) |
| OUTPUT COLOR SPACE | OUTPUT COLOR OF COLOR LUT (CMYK,K) |
| NUMBER OF GRID POINTS | NUMBER OF GRID POINTS IN COLOR LUT (6,9,17) |
| TABLE SIZE | DATA SIZE DERIVED FROM INPUT COLOR SPACE, OUTPUT COLOR SPACE,AND NUMBER OF GRID POINTS |

FIG. 5

| MANAGEMENT ID | COLOR LUT DATA |
|---|---|
| ID001 | COLOR LUT DATA_A |

FIG. 11

| ITEM | CONTENT |
|---|---|
| CHECK DATA | COMMENT FOR CONFIRMATION |
| SAMPLE DATA | SAMPLE DATA FOR CONFIRMATION (SAMPLE OF IMAGE) |
| COLOR LUT DATA | DATA OF COLOR LUT |

IMAGE FORMING SYSTEM, COMPUTER READABLE RECORDING MEDIUM STORING IMAGE FORMING PROGRAM AND IMAGE FORMING METHOD

CROSS REFERENCES TO RELATED APPLICATIONS

This application is based on Japanese Patent Application Nos. 2007-056797, filed on Mar. 7, 2007 and JP application 2007-056798, filed on Mar. 7, 2007 the contents of which are hereby incorporated by reference.

BACKGROUND OF THE INVENTION

1. Field of the Invention

This invention relates to an image forming system, a computer readable recording medium storing image forming program and an image forming method for generating download data from color lookup table data and performing image forming process based on the download data.

2. Description of the Related Art

Through the recent rapid spread of color image forming apparatuses such as color scanners, color copiers, etc., users can now have them download color lookup table data and then perform image forming process with download data generated based on the color lookup table data for their use and demand.

In such case, in general, as shown in FIG. 14, a developer of the color lookup table data uses a personal computer 11 and has it generate the download data by adding a component to the color lookup table data, and then he/she provides the download data to service persons or end users as operators. This process is referred as "download data generating process."

After the operator receives the download data, he/she accesses an image forming apparatus 13 through Internet, a USB (Universal Serial Bus) cable, or the like from the personal computer 12 to store the download data in an internal storing device 17 of the image forming apparatus 13 such as a HDD (Hard Disk Drive) 15, a memory 16, or the like by performing download using transmission of the download data or via an external medium 14 such as a SD (Secure Digital) memory card, a CF (Compact Flash) card, or the like that the download data is stored in and is inserted in the image forming device 13 to input the data. This process is referred as "download process."

In another relative art, a data processing system and a data processing method have means for acquiring component (property information) of color lookup table data stored in an image forming apparatus and detecting improper data by using the component (property information).

SUMMARY OF THE INVENTION

An image forming system according to an aspect of the present invention comprises a component data acquiring unit that acquires a component from color lookup table data; a verifying unit that determines whether or not the component of the color lookup table data acquired by the component data acquiring unit has been generated according to a predetermined generating rule; and a download data generating unit that downloads the color lookup table data and generates download data to be used in image forming processing from the color lookup table data after the verifying unit determines that the component has been generated according to the generating rule.

A computer readable recording medium according to an aspect of the present invention stores an image forming program. The program comprises the steps of: acquiring a component from color lookup table data; determining whether or not the component of the color lookup table data has been generated according to a predetermined generating rule; and downloading the color lookup table data and generating download data to be used in image forming processing from the color lookup table data after determining that the component has been generated according to the generating rule.

An image forming method according to an aspect of the present invention comprises the steps of: acquiring a component from color lookup table data; determining whether or not the component of the color lookup table data has been generated according to a predetermined generating rule; and downloading the color lookup table data and generating download data to be used in image forming processing from the color lookup table data after determining that the component has been generated according to the generating rule.

An image forming system according to an aspect of the present invention comprises: a confirmation data acquiring unit that acquires a data body of color lookup table data as a confirmation data; a download data acquiring unit that acquires a data body from download data to be used in image forming processing and generated from the color lookup table data; a data comparing unit that determines whether or not the confirmation data acquired by the confirmation data acquiring unit is identical to the data body acquired by the download data acquiring unit; and a comparison result outputting unit that outputs a comparison result generated by the data comparing unit.

A computer readable recording medium according to an aspect of the present invention stores an image forming program. The program comprises the steps of: acquiring a data body of color lookup table data as a confirmation data; acquiring a data body from download data to be used in image forming processing and generated from the color lookup table data; determining whether or not the acquired confirmation data is identical to the acquired data body; and outputting a result of determining whether or not the confirmation data is identical to the data body.

An image forming method according to an aspect of the present invention comprises the steps of: acquiring a data body of color lookup table data as a confirmation data; acquiring a data body from download data to be used in image forming processing and generated from the color lookup table data; determining whether or not the acquired confirmation data is identical to the acquired data body; and outputting a result of determining whether or not the confirmation data is identical to the data body.

These and other objects, features and advantages of the present invention will become more apparent upon reading of the following detailed description along with the accompanied drawings.

BRIEF DESCRIPTION OF THE DRAWINGS

FIG. 3 shows a structure of color lookup table data used for the image forming system in Embodiment 1 according to an aspect of the present invention;

FIG. 4 shows a structure of a generating rule used for the image forming system in Embodiment 1 according to an aspect of the present invention;

FIG. 5 shows a structure of download data used for the image forming system in Embodiment 1 according to an aspect of the present invention;

FIG. 11 shows a structure of confirmation data for the image forming system in Embodiment 2 according to an aspect of the present invention;

DETAILED DESCRIPTION OF THE PREFERRED EMBODIMENTS

Hereinafter, embodiments according to an aspect of the present invention will be explained with reference to drawings.

Embodiment 1

Figure 1:
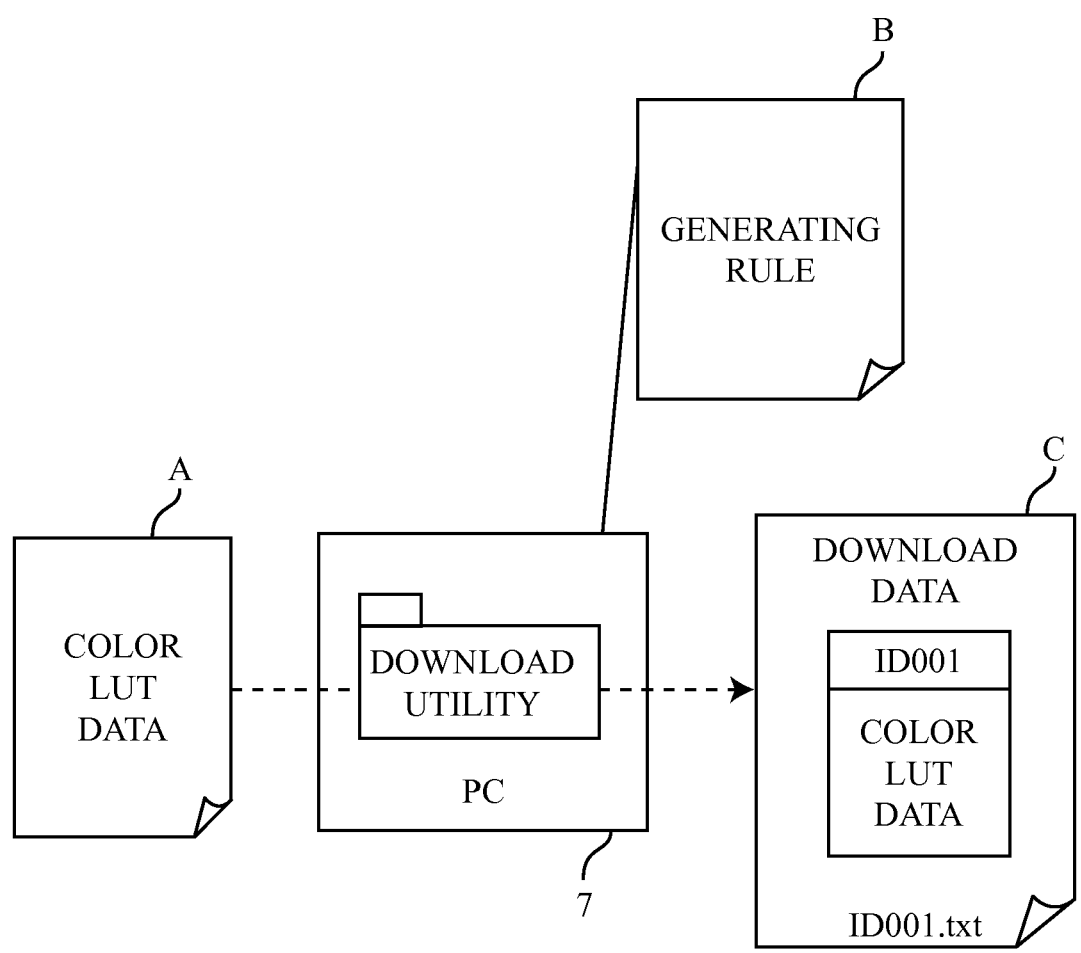
FIG. 1 shows a schematic diagram of an image forming system in Embodiment 1 according to an aspect of the present invention.
Figure 2:
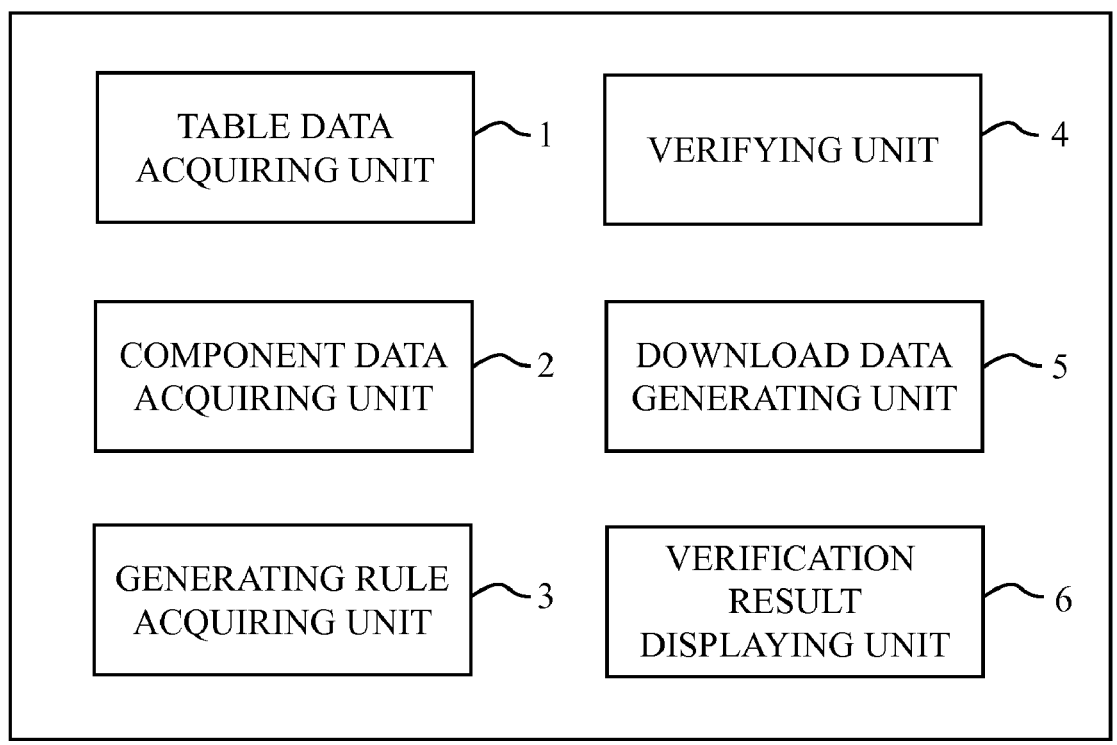
FIG. 2 shows a block diagram depicting a configuration of the image forming system in Embodiment 1 according to an aspect of the present invention.

FIG. 1 shows a schematic diagram of an image forming system in Embodiment 1 according to an aspect of the present invention. FIG. 2 shows a block diagram depicting a configuration of the image forming system.

As shown in FIG. 1, the image forming system of Embodiment 1 generates download data C if color lookup table data A has been generated according to a generating rule B, and performs image forming process based on the download data. The system is embodied with a download utility installed in a personal computer 7, for example.

This image forming system (i.e. the download utility) has a table data acquiring unit 1, a component data acquiring unit 2, a generating rule acquiring unit 3, a verifying unit 4, a download data generating unit 5, and a verification result displaying unit 6. The unit 1 acquires color lookup table data A made by a developer. The unit 2 acquires a component Aa from the color lookup table data A acquired by the unit 1. The unit 3 acquires a predetermined generating rule B. The unit 4 determines whether or not the component Aa (see FIG. 3) of the color lookup table data A acquired by the unit 2 has been generated according to the generating rule B. The unit 5 downloads the color lookup table data A and generates download data based on the lookup table data after the unit 4 determines that the component Aa has been generated according to the generating rule B. The unit 6 displays a verification result of determining whether or not the component Aa has been generated according to the generating rule B by the unit 4.

FIG. 3 shows a structure of the color lookup table data A. The color lookup table data A has the component Aa and a body Ab as a data body of the color lookup table A. In this embodiment, the component Aa consists of input color space information denoting input color such as RGB, CMYK, LAB, grayscale, or the like, output color space information denoting output color such as CMYK, K, or the like, target object information denoting a target object such as Image, Text, Vector, ALL, or the like, and the number of grid points such as 6, 9, 17, or the like.

FIG. 4 shows a structure of the generating rule B. In this embodiment, the generating rule B has input color space information denoting input color such as RGB, CMYK, LAB, grayscale, or the like, output color space information denoting output color such as CMYK, K, or the like, the number of grid points such as 6, 9, 17, or the like, and data size derived from the input color space, the output color space and the number of grid points.

FIG. 5 shows a structure of the download data C. In this embodiment, the download data C has the color lookup table data A shown in FIG. 3 and a management ID (e.g. ID001) attached to the data A.

Figure 6:
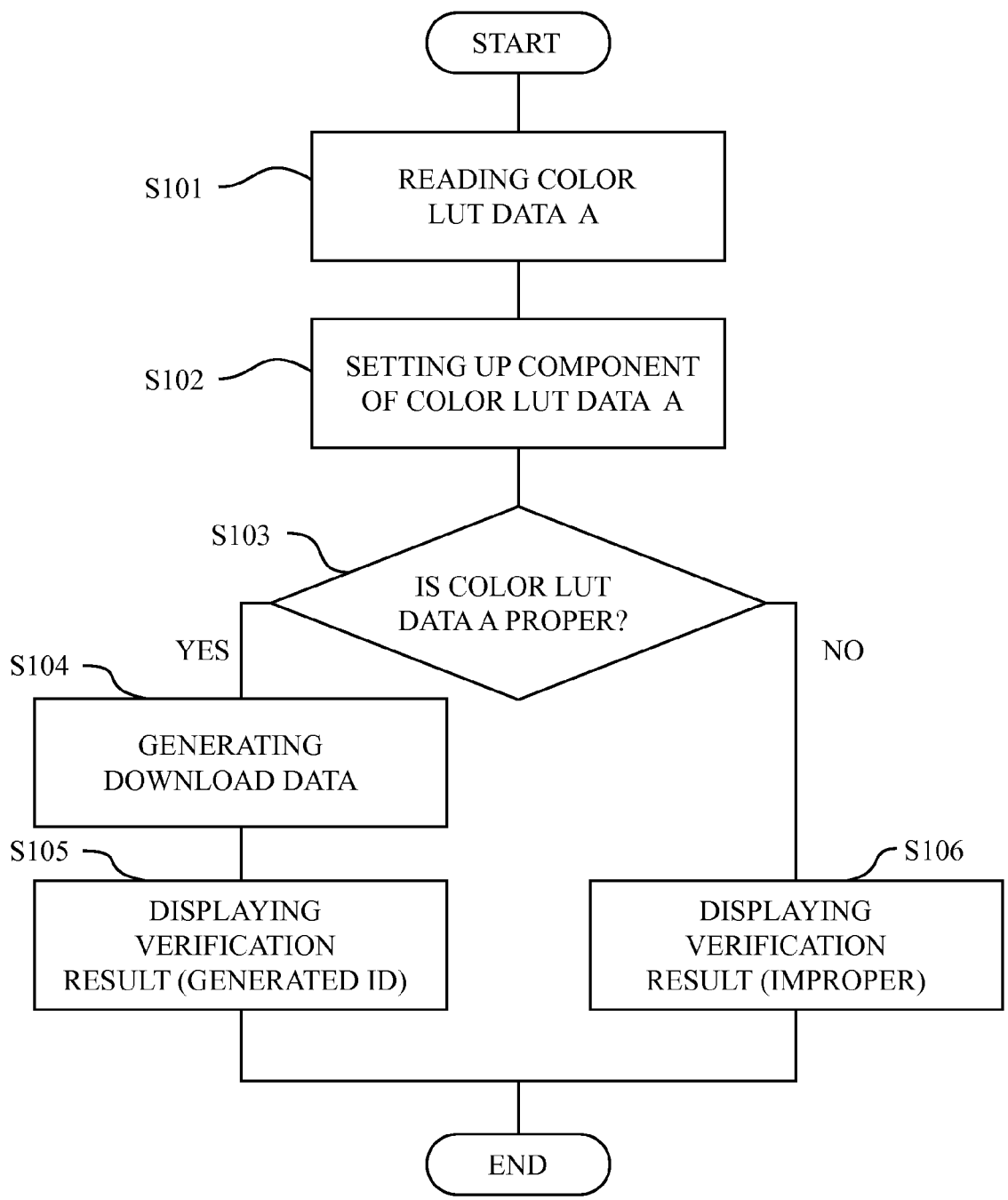
FIG. 6 shows a flowchart of processing procedure of the image forming system of Embodiment 1 according to an aspect of the present invention.

Next, processing procedure of the image forming system of Embodiment 1 will be explained with reference to drawings. FIG. 6 shows a flowchart of processing procedure of the image forming system of Embodiment 1. In the following explanation, for example, it is assumed that download data is generated based on color lookup table data with the number of grid points of "9" and the color of "RGB" for "Image."

Firstly, a color lookup table data developed by a developer is read (S101), and the value of each item in the component Aa is set up for the color lookup table data (S102) according to the developer's operation. In Embodiment 1, input color space, output color space, target object and number of grid points of items in the components are set to RGB, CMYK, Image, and 9, respectively. Such setup of the component Aa may be performed by directly inputting the values on a property setting screen or reading the values from a file.

After the setup, the component data acquiring unit 2 acquires the component Aa from the color lookup table data A acquired by the table data acquiring unit 1. In order to verify the color lookup table data A, the verifying unit 4 determines whether or not input color, output color and number of grid points have been set to any of values predetermined in the generating rule B acquired by the generating rule acquiring unit 3 and whether or not the size of the acquired color lookup table data A is identical to the table data size derived from the component Aa (S103).

If the verifying unit 4 determines that the color lookup table data A is proper, then the download data generating unit 5 generates download data C by attaching a management ID to the color lookup table data A (S104) and the verification result displaying unit 6 displays the verification result with the management ID (S105).

Contrary to this, if the verifying unit 4 determines that the color lookup table data A is not proper in S103, the verification result displaying unit 6 displays that the component Aa has been set to values other than the values in the rule and/or that the size of the acquired color lookup table data A is not identical to the table data size derived from the component Aa (S106).

As mentioned above, the image forming system of Embodiment 1 according to an aspect of the present invention provides high reliable download data C to operators since it is capable of detecting improper data before downloading the color lookup table data A to prevent download data C from containing the improper data. Consequently, it can reduce not only operator's mental burden and checking operation but also time spent for processing the download data C.

It should be noted that in Embodiment 1 mentioned above, as a specific example, the verifying unit 4 determines whether or not all items in the component Aa are properly set according to the generating rule B in order to verify the color lookup table data A; in the system, various modifications are available. For example, in order to verify the color lookup table data A, a small number of item(s) may be verified, such as only the data size, the data size and the input color space, the data size and the output color space, the data size and the number of grid points, or the like.

Embodiment 2

Figure 7:
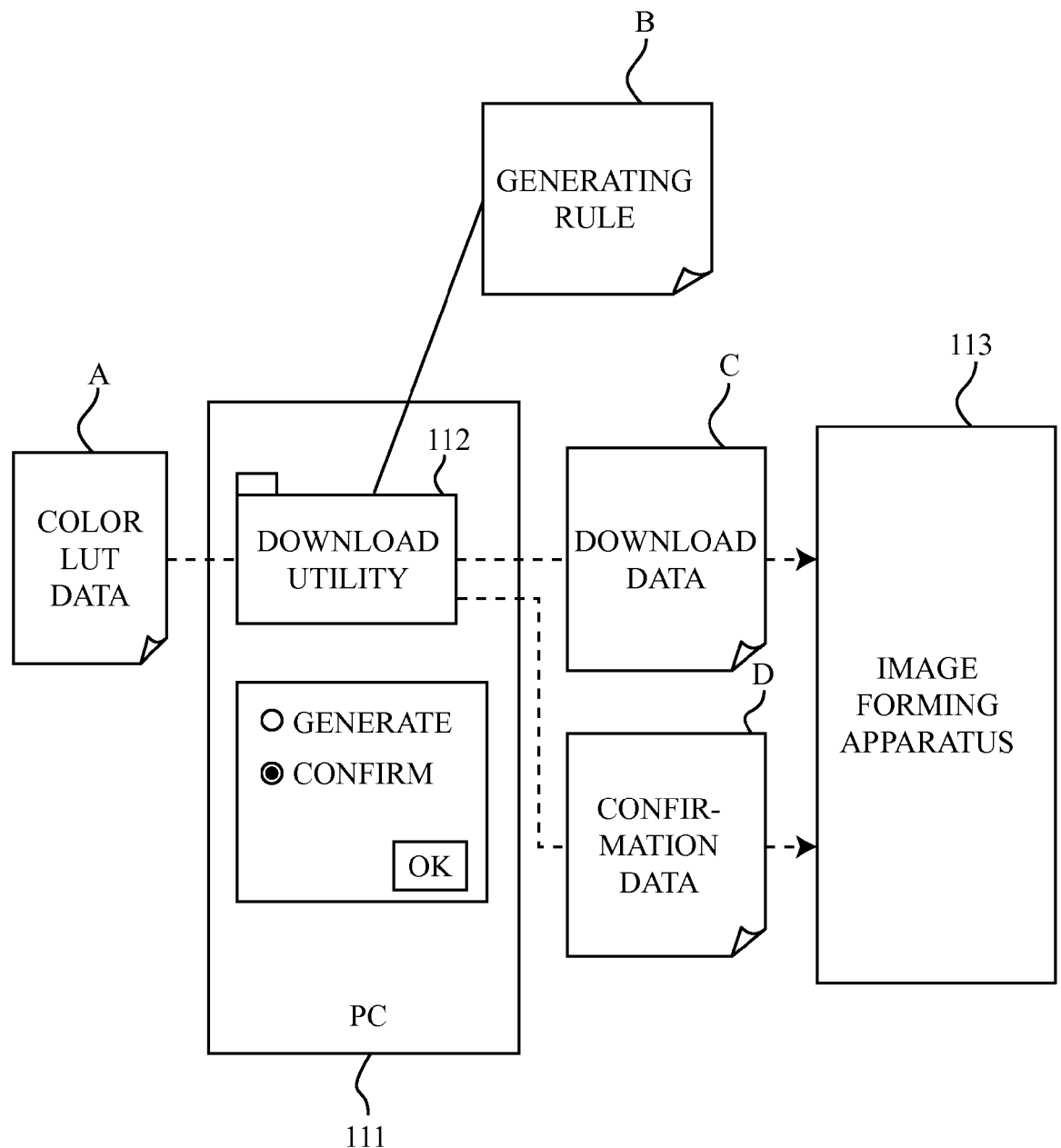
FIG. 7 shows a schematic diagram of an image forming system in Embodiment 2 according to an aspect of the present invention.
Figure 8:
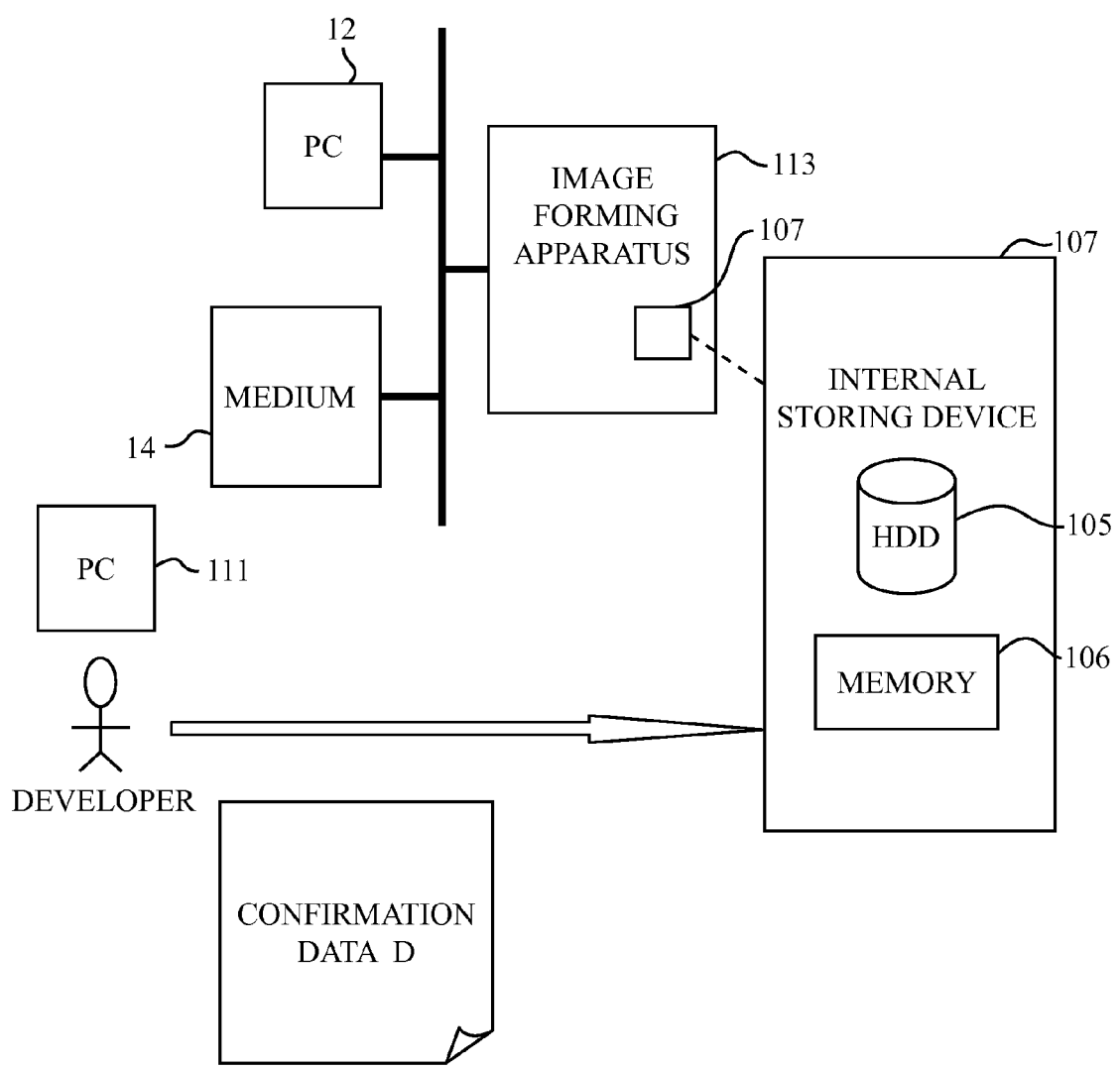
FIG. 8 shows a schematic diagram depicting transmission of confirmation data in the image forming system in Embodiment 2 according to an aspect of the present invention.
Figure 9:
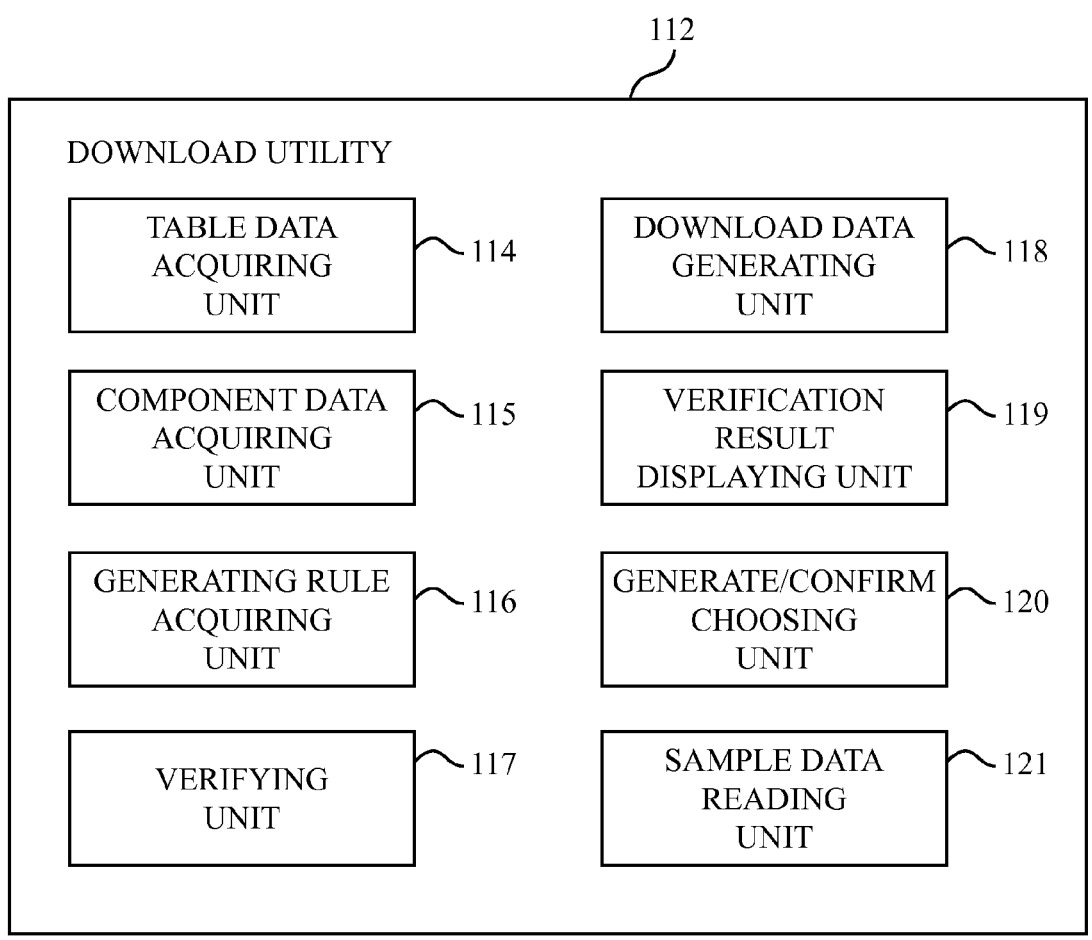
FIG. 9 shows a block diagram depicting a configuration of a download utility used for the image forming system in Embodiment 2 according to an aspect of the present invention.
Figure 10:
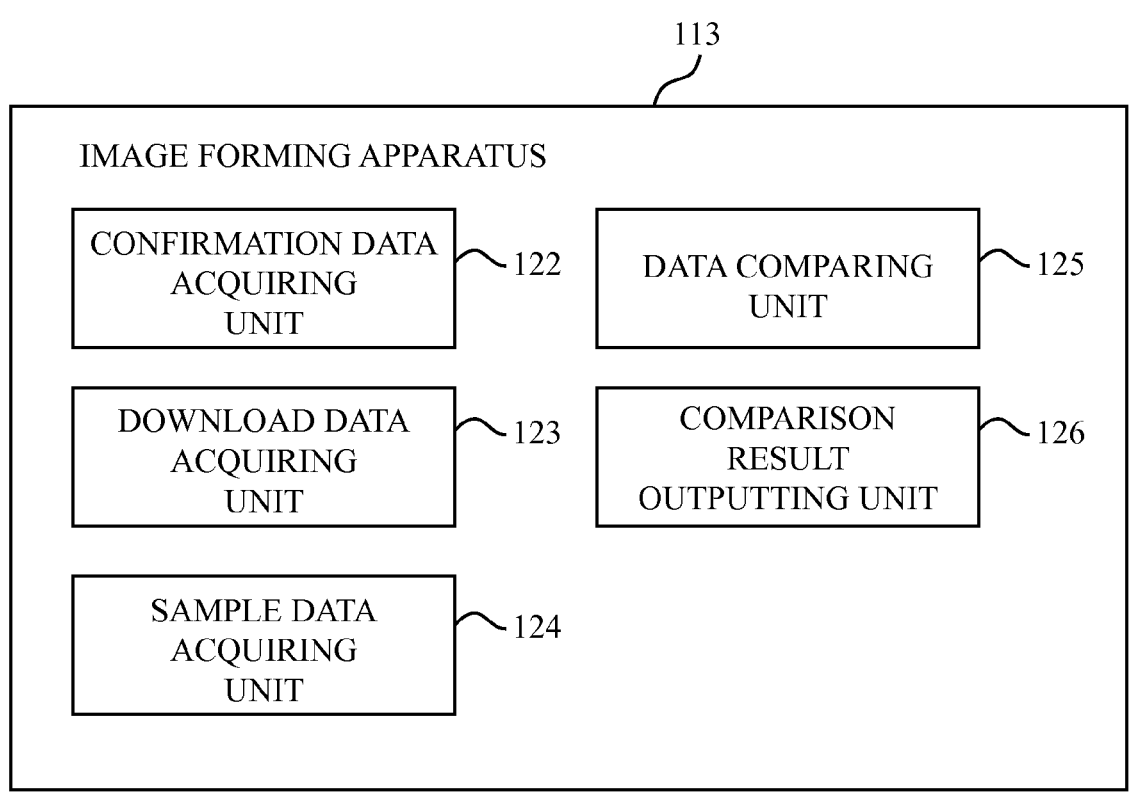
FIG. 10 shows a block diagram depicting a configuration of the image forming system in Embodiment 2 according to an aspect of the present invention.
Figure 14:
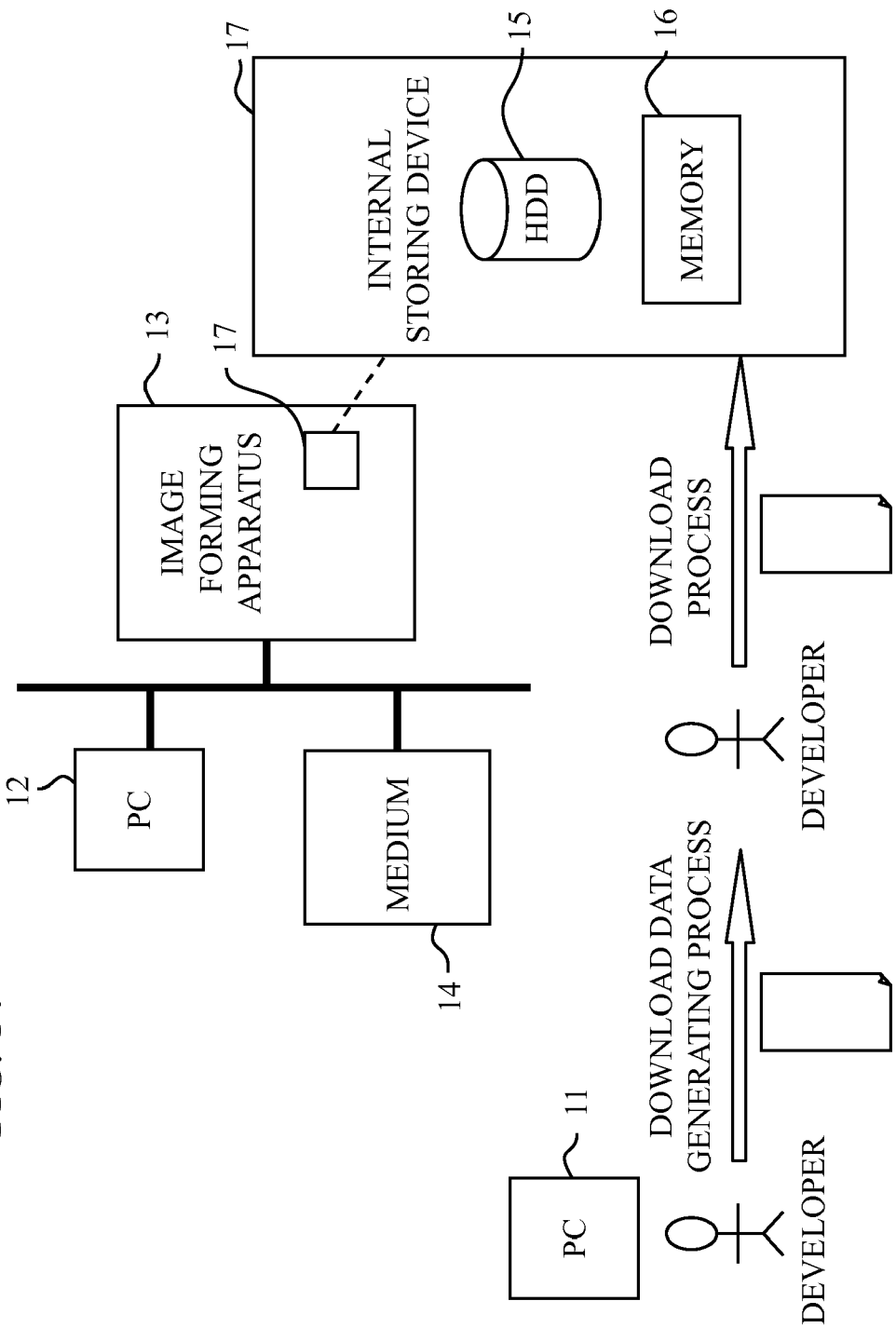
FIG. 14 shows a schematic diagram depicting a related art.

FIG. 7 shows a schematic diagram of an image forming system in Embodiment 2 according to an aspect of the present invention. FIG. 8 shows a schematic diagram depicting transmission of confirmation data in the image forming system. FIG. 9 shows a block diagram depicting a configuration of a download utility in the image forming system. FIG. 10 shows a block diagram depicting a configuration of the image forming system. It should be noted that detailed explanation will be omitted on the same members in FIG. 8 as ones in FIG. 14.

The image forming system of Embodiment 2 generates download data C if color lookup table data A has been generated according to a generating rule B as shown in FIG. 7 and compares the download data C with confirmation data D that is proper data body of the color lookup table data A transmitted by a personal computer 111 of a developer and then outputs a result of the comparison. In Embodiment 2, the system is embodied with a download utility 112 installed in the personal computer 111 and an image forming apparatus 113.

As shown in FIG. 9, the download utility 112 has a table data acquiring unit 114, a component data acquiring unit 115, a generating rule acquiring unit 116, a verifying unit 117, a download data generating unit 118, a verification result displaying unit 119, a generate/confirm choosing unit 120, and a sample data reading unit 121. The unit 114 acquires color lookup table data A made by a developer. The unit 115 acquires a component Aa (see FIG. 3) from the color lookup table data A acquired by the unit 114. The unit 116 acquires a predetermined generating rule B. The unit 117 determines whether or not the component Aa of the color lookup table data A acquired by the unit 115 has been generated according to the generating rule B. The unit 118 downloads the color lookup table data A and generates download data based on the table data after the unit 117 determines that the component Aa has been generated according to the generating rule B. The unit 119 displays a verification result of determining whether or not the component Aa has been generated according to the generating rule B by the unit 117. The unit 120 provides a screen on the personal computer 111 for choosing one of items: (a) generating new download data C and (b) confirming download data C that has already been generated. The unit 121 reads in sample data for confirmation if the sample data is available.

As shown in FIG. 10, the image forming apparatus 113 has a confirmation data acquiring unit 122, a download data acquiring unit 123, a sample data reading unit 124, a data comparing unit 125, and a comparison result outputting unit 126. The unit 122 acquires a data body of the color lookup table data A as a confirmation data D. The unit 123 acquires a data body from the download data C that has already been downloaded. The unit 124 reads in sample data for confirmation if the sample data is available. The unit 125 determines whether or not the confirmation data D acquired by the unit 122 is identical to the data body acquired by the unit 123. The unit 126 outputs a comparison result generated by the unit 125.

FIG. 11 shows a structure of the confirmation data D. The confirmation data D has a proper data body Ab of the color lookup table data specified by the developer as shown in FIG. 3, check data consisting of a comment for confirmation, and sample data consisting of an image.

Figure 12:
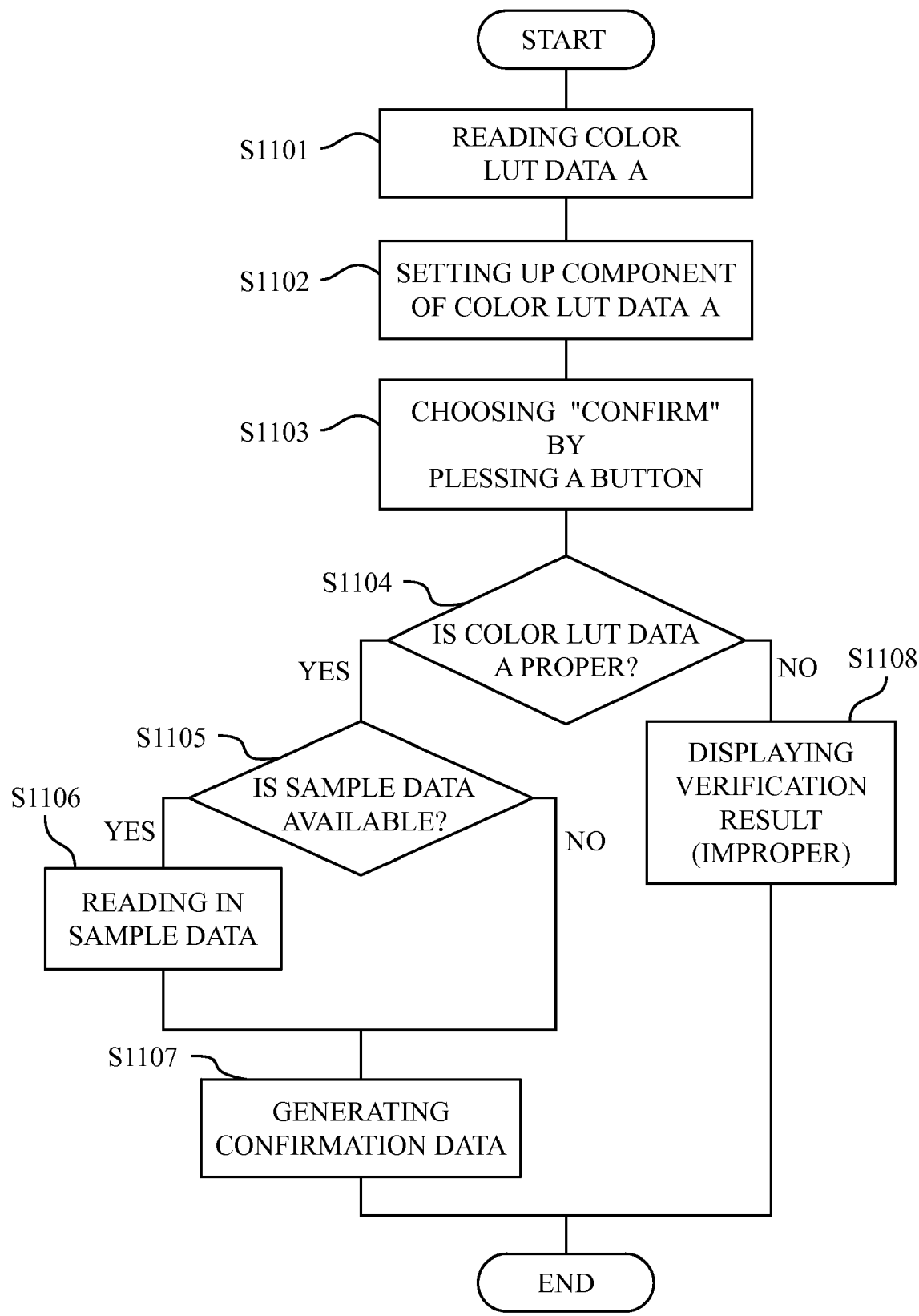
FIG. 12 shows a flowchart of processing procedure of the image forming system of Embodiment 2 according to an aspect of the present invention.

Next, processing procedure of generating the confirmation data in the image forming system of Embodiment 2 will be explained with reference to FIG. 12. In the following explanation, for example, it is assumed that download data is generated based on color lookup table data with the number of grid points of "9" and the color of "RGB" for "Image."

Firstly, a color lookup table data developed by a developer is read (S1101), and the value of each item in the component Aa is set up for the color lookup table data (S1102) according to the developer's operation. In Embodiment 2, input color space, output color space, target object and number of grid points of items in the components are set to RGB, CMYK, Image, and 9, respectively. Such setup of the component Aa may be performed by directly inputting the values on a property setting screen or reading the values from a file.

After the setup, if "confirm" is chosen by the developer's operation on the screen provided by the generate/confirm choosing unit 120 in the personal computer 111 (S1103), then the component data acquiring unit 115 acquires the component Aa from the color lookup table data A acquired by the table data acquiring unit 114, and in order to verify the color lookup table data A, the verifying unit 117 determines whether or not input color, output color and number of grid points have been set to any of values predetermined in the generating rule B acquired by the generating rule acquiring unit 116 and whether or not the size of the acquired color lookup table data A is identical to the table data size derived from the component Aa (S1104). In case that "generate" is chosen by the developer's operation in S1103, not shown in FIG. 12, this process is finished after the download data C is generated by attaching a management ID to the color lookup table data A.

If, as the verification result in Step S1104, the verifying unit 117 determines that the color lookup table data A is proper, then the sample data reading unit 121 determines whether or not sample data for confirmation is available (S1105). If sample data for confirmation is available, then the unit 117 reads in the sample data (S1106) and generates confirmation data D based on the sample data (S1107). If sample data for confirmation is not available, then the unit 117 generates confirmation data D without sample data (S1107).

Contrary to this, if it is determined that the color lookup table data A is not proper by the verifying unit 117 in Step S1104, the verification result displaying unit 119 displays that the component Aa has been set to values other than the values in the rule and/or that the size of the acquired color lookup table data A is not identical to the table data size derived from the component Aa (S1108).

Figure 13:
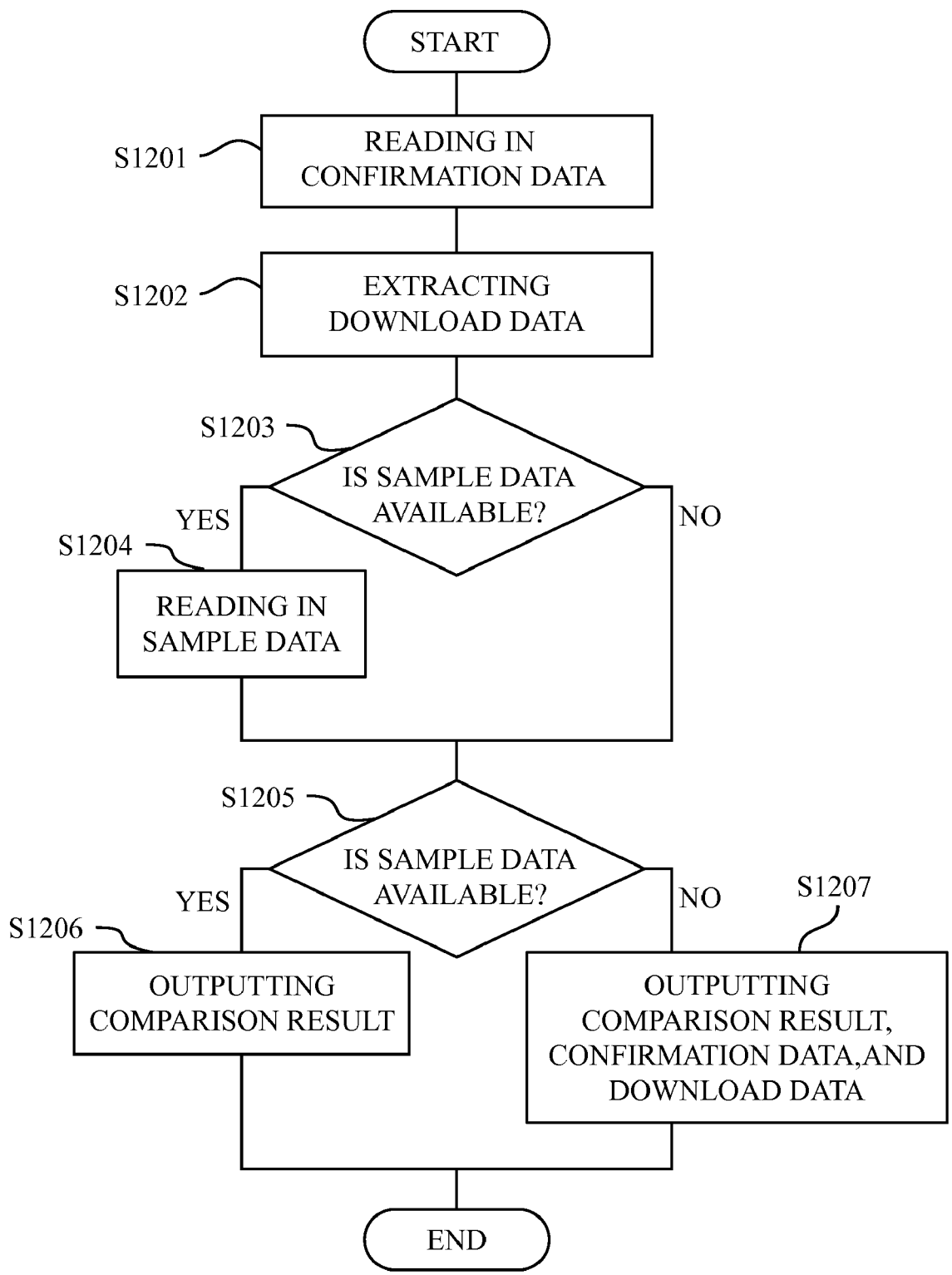
FIG. 13 shows a flowchart of processing procedure of generating confirmation data in the image forming system of Embodiment 2 according to an aspect of the present invention.

Next, processing procedure of confirmation in the image forming system of Embodiment 2 will be explained with reference to FIG. 13.

In the image forming apparatus 113, the confirmation data acquiring unit 122 reads in the confirmation data D (S1201), and the download data acquiring unit 123 extracts a data body of the download data C from an internal storing device 107 in the image forming apparatus 113 in which the download data C has been downloaded (S1202).

The sample data reading unit 124 determines whether or not sample data for confirmation is available (S1203). If sample data for confirmation is available, then the unit 124 reads in the sample data (S1204). After Step S1204, Step S1205 will be done. If sample data for confirmation is not available, then Step S1205 will be done without reading in the sample data.

In Step S1205, the data comparing unit 125 determines whether or not the confirmation data D is identical to the data body of the download data C. If the data comparing unit 125 determines that both are identical, then the comparison result outputting unit 126 outputs as check data a comment that both data are identical (S1206). At this time, the unit 126 outputs the sample data together with the check data if it is determined that the sample data is available in Step S1203.

Contrary to the above, if the data comparison unit 125 determines that the confirmation data D is not identical to the data body of the download data C, the comparison result outputting unit 126 outputs a confirmation data D and the data body of the download data C together with version information of the download data, identification information and the like (S1207). This confirmation data includes a check data consisting of a comment that the data D and the data body are not identical. At this time, the unit 126 outputs the sample data together if it is determined that the sample data is available in Step S1203.

As mentioned above, the image forming system of Embodiment 2 according to an aspect of the present invention provides high reliable download data C since the confirmation data is used to confirm that the data body of the color lookup table data A specified by the developer is properly used. Consequently, it can reduce time and cost spent for modifying the download data C.

In addition, high reliable download data C is provided to operators since the system is capable of detecting improper data before downloading the color lookup table data A to prevent download data C from containing the improper data. Consequently, it can reduce not only operator's mental burden and checking operation but also time spent for processing the download data C.

It should be noted that in Embodiment 2 mentioned above, as a specific example, the verifying unit 117 determines whether or not all items in the component Aa are properly set according to the generating rule B in order to verify the color lookup table data A; in the system, various modifications are available. For example, in order to verify the color lookup table data A, a small number of item(s) may be verified, such as only the data size, the data size and the input color space, the data size and the output color space, the data size and the number of grid points, or the like.

Moreover, in Embodiments 1 and 2, an aspect of the present invention is carried out by the download utility installed in PC and the image forming apparatus as a specific example; in the system, various modifications are available. For example, the image forming apparatus may have the same feature as the download utility.

Furthermore, the items in the component Aa of the color lookup table data A described in Embodiments 1 and 2 are specific examples; in the system, various modifications of the items are available. For example, some items without the target object may be used.

It should be noted that an image forming program is provided with a computer readable recording medium such as ROM, hard disc drive, flexible disc, memory card, optic/magnetic disc, or the like. The image forming program is read into an electronic device from the computer readable recording medium, and the program is executed by a computer in the electronic device to embody the units described above for providing instructions to members in the electronic device and causing to process.

In view of the embodiments described above, some aspects of the present invention are summarized as follows. An image forming system according to an aspect of the present invention comprises a component data acquiring unit that acquires a component from color lookup table data; a verifying unit that determines whether or not the component of the color lookup table data acquired by the component data acquiring unit has been generated according to a predetermined generating rule; and a download data generating unit that downloads the color lookup table data and generates download data to be used in image forming processing from the color lookup table data after the verifying unit determines that the component has been generated according to the generating rule.

The image forming system according to an aspect of the present invention may further comprise a verification result displaying unit that displays a result of determining whether or not the component has been generated according to the generating rule by the verifying unit.

A computer readable recording medium according to an aspect of the present invention stores an image forming program. The program comprises the steps of: acquiring a component from color lookup table data; determining whether or not the component of the color lookup table data has been generated according to a predetermined generating rule; and downloading the color lookup table data and generating download data to be used in image forming processing from the color lookup table data after determining that the component has been generated according to the generating rule.

The computer readable recording medium according to an aspect of the present invention may store the image forming program further comprising the step of: displaying a result of determining whether or not the component has been generated according to the generating rule.

An image forming method according to an aspect of the present invention comprises the steps of: acquiring a component from color lookup table data; determining whether or not the component of the color lookup table data has been generated according to a predetermined generating rule; and downloading the color lookup table data and generating download data to be used in image forming processing from the color lookup table data after determining that the component has been generated according to the generating rule.

The image forming method according to an aspect of the present invention may further comprise the step of: displaying a result of determining whether or not the component has been generated according to the rule.

According to an aspect of the present invention, not only operator's mental burden and checking operation but also time spent for processing the download data can be reduced by surely preventing download data from containing the improper data.

An image forming system according to an aspect of the present invention comprises: a confirmation data acquiring unit that acquires a data body of color lookup table data as a confirmation data; a download data acquiring unit that acquires a data body from download data to be used in image forming processing and generated from the color lookup table data; a data comparing unit that determines whether or not the confirmation data acquired by the confirmation data acquiring unit is identical to the data body acquired by the download data acquiring unit; and a comparison result outputting unit that outputs a comparison result generated by the data comparing unit.

In the image forming system according to an aspect of the present invention, the comparison result outputting unit may simultaneously output the data body of the download data and a confirmation data including a comment that the confirmation data acquired by the confirmation data acquiring unit is not identical to the data body if the data comparing unit determines that the confirmation data acquired by the confirmation data acquiring unit is not identical to the data body acquired by the download data acquiring unit.

The image forming system according to an aspect of the present invention may further comprise: a component data acquiring unit that acquires a component from color lookup table data; a verifying unit that determines whether or not the component of the color lookup table data acquired by the component data acquiring unit has been generated according to a predetermined generating rule; a download data generating unit that downloads the color lookup table data and generates download data to be used in image forming processing from the color lookup table data after the verifying unit determines that the component has been generated according to the generating rule; and a verification result displaying unit that displays a result of determining whether or not the component has been generated according to the generating rule by the verifying unit.

A computer readable recording medium according to an aspect of the present invention stores an image forming program. The program comprises the steps of: acquiring a data body of color lookup table data as a confirmation data; acquiring a data body from download data to be used in image forming processing and generated from the color lookup table data; determining whether or not the acquired confirmation data is identical to the acquired data body; and outputting a result of determining whether or not the confirmation data is identical to the data body.

The computer readable recording medium according to an aspect of the present invention may store the image forming program further comprising the step of: simultaneously outputting the data body of the download data and a confirmation data including a comment that the confirmation data acquired by the confirmation data acquiring unit is not identical to the data body if it is determined that the acquired confirmation data is not identical to the acquired data body.

The computer readable recording medium according to an aspect of the present invention may store the image forming program further comprising the steps of: acquiring a component from color lookup table data; determining whether or not the component of the color lookup table data has been generated according to a predetermined generating rule; downloading the color lookup table data and generating download data to be used in image forming processing from the color lookup table data after determining that the component has been generated according to the generating rule; and displaying a result of determining whether or not the component has been generated according to the generating rule.

An image forming method according to an aspect of the present invention comprises the steps of: acquiring a data body of color lookup table data as a confirmation data; acquiring a data body from download data to be used in image forming processing and generated from the color lookup table data; determining whether or not the acquired confirmation data is identical to the acquired data body; and outputting a result of determining whether or not the confirmation data is identical to the data body.

The image forming method according to an aspect of the present invention may further comprise the step of: simultaneously outputting the data body of the download data and a confirmation data including a comment that the confirmation data acquired by the confirmation data acquiring unit is not identical to the data body if it is determined that the acquired confirmation data is not identical to the acquired data body.

The image forming method according to an aspect of the present invention may further comprise the steps of: acquiring a component from color lookup table data; determining whether or not the component of the color lookup table data has been generated according to a predetermined generating rule; downloading the color lookup table data and generating download data to be used in image forming processing from the color lookup table data after determining that the component has been generated according to the generating rule; and displaying a result of determining whether or not the component has been generated according to the generating rule.

According to an aspect of the present invention, high reliable download data can be provided since the confirmation data is used to confirm that the data body of the color lookup table data specified by the developer is properly used. Consequently, it can reduce time and cost spent for fixing the download data.

What is claimed is:

1. An image forming system comprising:
   a component data acquiring unit that acquires a component from a color lookup table data;
   a generating rule acquiring unit that acquires a predetermined generating rule; said predetermined generating rule being used to create said color lookup table;
   a verifying unit that determines whether or not the component of the color lookup table data acquired by the component data acquiring unit has been generated according to a predetermined generating rule; and
   a download data generating unit that downloads the color lookup table data and generates download data to be used in image forming processing from the color lookup table data if the verifying unit determines that the component has been generated according to the generating rule and does not download the color lookup table if the verifying unit determines that the component has not been generated according to the generating rule and
   a verification result displaying unit that displays a result of determining whether or not the component has been generated according to the generating rule by displaying a management ID that has been attached to the color lookup table if the verifying unit determines that the component has been generated according to the generating rule and displaying the reason why if the verifying unit determined that the component was not been generated according to the generating rule.

2. The image forming system according to claim 1, wherein the generating rule has input color space information, output color space information, and the number of grid points; and the verifying unit determines whether or not the component of the color lookup table data has been generated according to the generating rule if input color space, output color and the number of grids of the component are identical to the input color space information, the output color space information, and the number of grid points of the generating rule, respectively.

3. A non-transitory computer readable recording medium storing an image forming program, the program comprises the steps of:

acquiring a component from color lookup table data;
acquiring a predetermined generating rule; said predetermined generating rule being used to create said color lookup table;
determining whether or not the component of the color lookup table data has been generated according to the predetermined generating rule; and
downloading the color lookup table data and generating download data to be used in image forming processing from the color lookup table data only if determining that the component has been generated according to the generating rule and
displaying a result of whether or not the component has been generated according to the generating rule by displaying a management ID that has been attached to the color lookup table if the component has been generated according to the generating rule and displaying the reason why if it was determined that the component was not been generated according to the generating rule.

4. The computer readable recording medium according to claim 3, wherein the generating rule has input color space information, output color space information, and the number of grid points; and the program determines whether or not the component of the color lookup table data has been generated according to the generating rule if input color space, output color and the number of grids of the component are identical to the input color space information, the output color space information, and the number of grid points of the generating rule, respectively.

5. An image forming method comprising the steps of:
acquiring a component from color lookup table data;
determining whether or not the component of the color lookup table data has been generated according to a predetermined generating rule; said predetermined generating rule being used to create said color lookup table; and
downloading the color lookup table data and generating download data to be used in image forming processing from the color lookup table data only if determining that the component has been generated according to the generating rule and
displaying a result of determining whether or not the component has been generated according to the generating rule by displaying a management ID that has been attached to the color lookup table if the component has been generated according to the generating rule and displaying the reason why if it was determined that the component was not been generated according to the generating rule.

6. The image forming method according to claim 5, wherein determining whether or not the component of the color lookup table data has been generated according to the generating rule if input color space, output color and the number of grids of the component are identical to input color space information, output color space information, and the number of grid points of the generating rule, respectively.

7. An image forming system comprising:
a download utility installed in a personal computer; and
an image forming apparatus;
wherein the download utility comprises: a component data acquiring unit that acquires a component from color lookup table data;
a verifying unit that determines whether or not the component of the color lookup table data acquired by the component data acquiring unit has been generated according to a predetermined generating rule; said predetermined generating rule being used to create said color lookup table;
a download data generating unit that downloads the color lookup table data and generates download data to be used in image forming processing from the color lookup table data after the verifying unit determines that the component has been generated according to the generating rule and does not download the color lookup table if the verifying unit determines that the component has not been generated according to the generating rule;
a verification result displaying unit that displays a result of determining whether or not the component has been generated according to the generating rule by the verifying unit by displaying a management ID that has been attached to the color lookup table if the verifying unit determines that the component has been generated according to the generating rule and displaying the reason why if the verifying unit determined that the component was not been generated according to the generating rule; and
the image forming apparatus comprises:
a confirmation data acquiring unit that acquires a data body of the color lookup table data as a confirmation data;
a download data acquiring unit that acquires a data body from the download data to be used in image forming processing
a data comparing unit that determines whether or not the confirmation data acquired by the confirmation data acquiring unit is identical to the data body acquired by the download data acquiring unit; and
a comparison result outputting unit that outputs a comparison result generated by the data comparing unit and.

8. The image forming system according to claim 7, wherein the comparison result outputting unit simultaneously outputs the data body of the download data and a confirmation data including a comment that the confirmation data acquired by the confirmation data acquiring unit is not identical to the data body if the data comparing unit determines that the confirmation data acquired by the confirmation data acquiring unit is not identical to the data body acquired by the download data acquiring unit.

9. The image forming system according to claim 7, wherein the generating rule has input color space information, output color space information, and the number of grid points; and the verifying unit determines whether or not the component of the color lookup table data has been generated according to the generating rule if input color space, output color and the number of grids of the component are identical to the input color space information, the output color space information, and the number of grid points of the generating rule, respectively.

* * * * *